United States Patent
Murakami

(10) Patent No.: US 8,587,181 B2
(45) Date of Patent: Nov. 19, 2013

(54) PIEZO-ELECTRIC ACTUATOR DRIVE CIRCUIT AND PIEZO-ELECTRIC ACTUATOR DEVICE FURNISHED WITH SAME

(75) Inventor: Tadaaki Murakami, Saitama (JP)

(73) Assignee: Tamron Co., Ltd., Saitama (JP)

( * ) Notice: Subject to any disclaimer, the term of this patent is extended or adjusted under 35 U.S.C. 154(b) by 190 days.

(21) Appl. No.: 13/211,602

(22) Filed: Aug. 17, 2011

(65) Prior Publication Data

US 2011/0298401 A1 Dec. 8, 2011

(30) Foreign Application Priority Data

Sep. 2, 2010 (JP) ................. 2010-196434

(51) Int. Cl.
*H02N 2/14* (2006.01)
(52) U.S. Cl.
CPC ..................... *H02N 2/145* (2013.01)
USPC ......................................................... 310/317
(58) Field of Classification Search
CPC ................. H02N 2/142; H02N 2/145
USPC ........................................ 310/314, 317, 328
See application file for complete search history.

(56) References Cited

U.S. PATENT DOCUMENTS

2005/0253485 A1* 11/2005 Kishi ..................... 310/323.16
2007/0040471 A1* 2/2007 Ollila .......................... 310/317

FOREIGN PATENT DOCUMENTS

JP 4406952 B2 10/2000

* cited by examiner

*Primary Examiner* — Derek Rosenau
(74) *Attorney, Agent, or Firm* — Westerman, Hattori, Daniels & Adrian, LLP

(57) ABSTRACT

To provide a piezo-electric actuator drive circuit capable of efficiently driving a piezo-electric actuator. The present invention is a piezo-electric actuator drive circuit (3) for driving a piezo-electric actuator (2) in which a drive voltage is applied to polarizing sections (4a, 4b), and includes a high voltage power supply (14), a high-side switching element (16), a low-side switching element (18), and a switching element control circuit (12) for applying a voltage pulse to polarizing sections and driving the piezo-electric actuator by switching between a voltage-applied period in which only the high-side switching element is in a conductive state, a floating period in which both the high-side switching element and the low-side switching element are in a nonconductive state, and a grounded period in which only the low-side switching element is in a conducting state.

5 Claims, 8 Drawing Sheets

FIG. 2
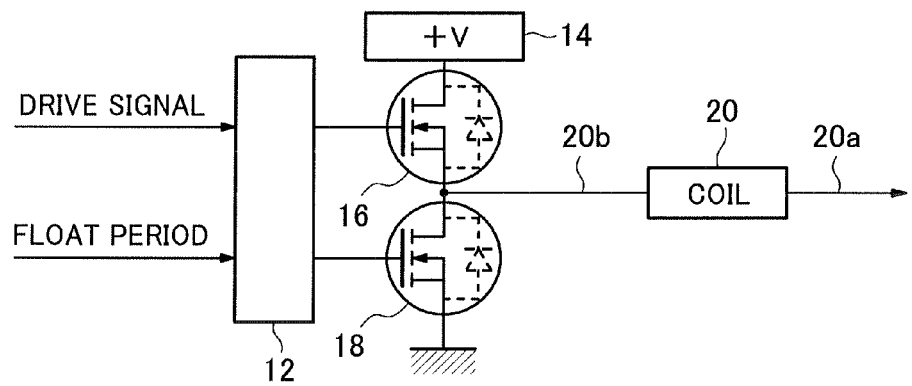
(a)
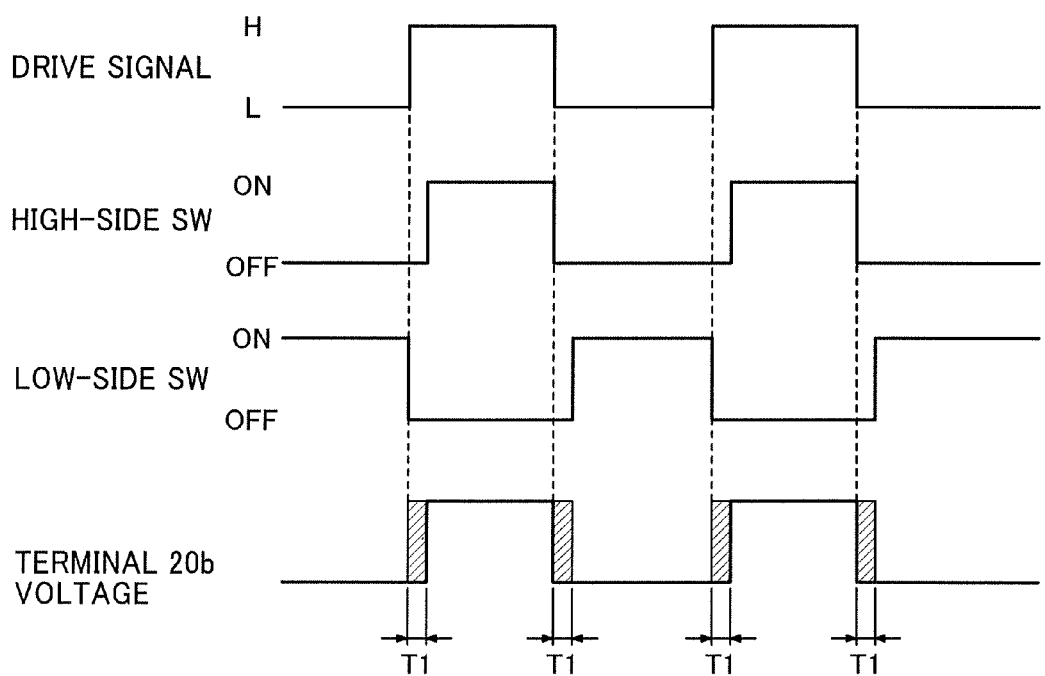
(b)

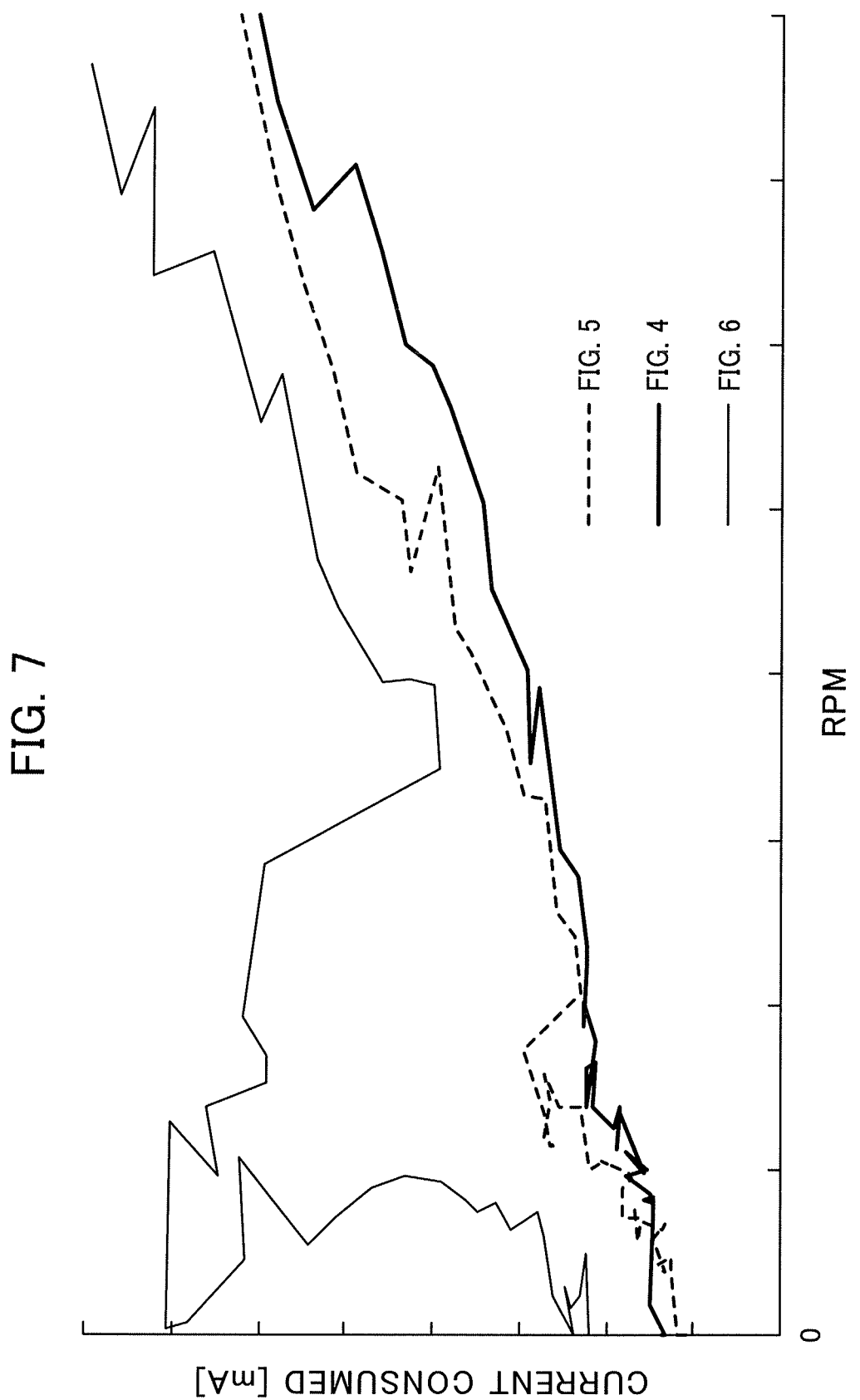

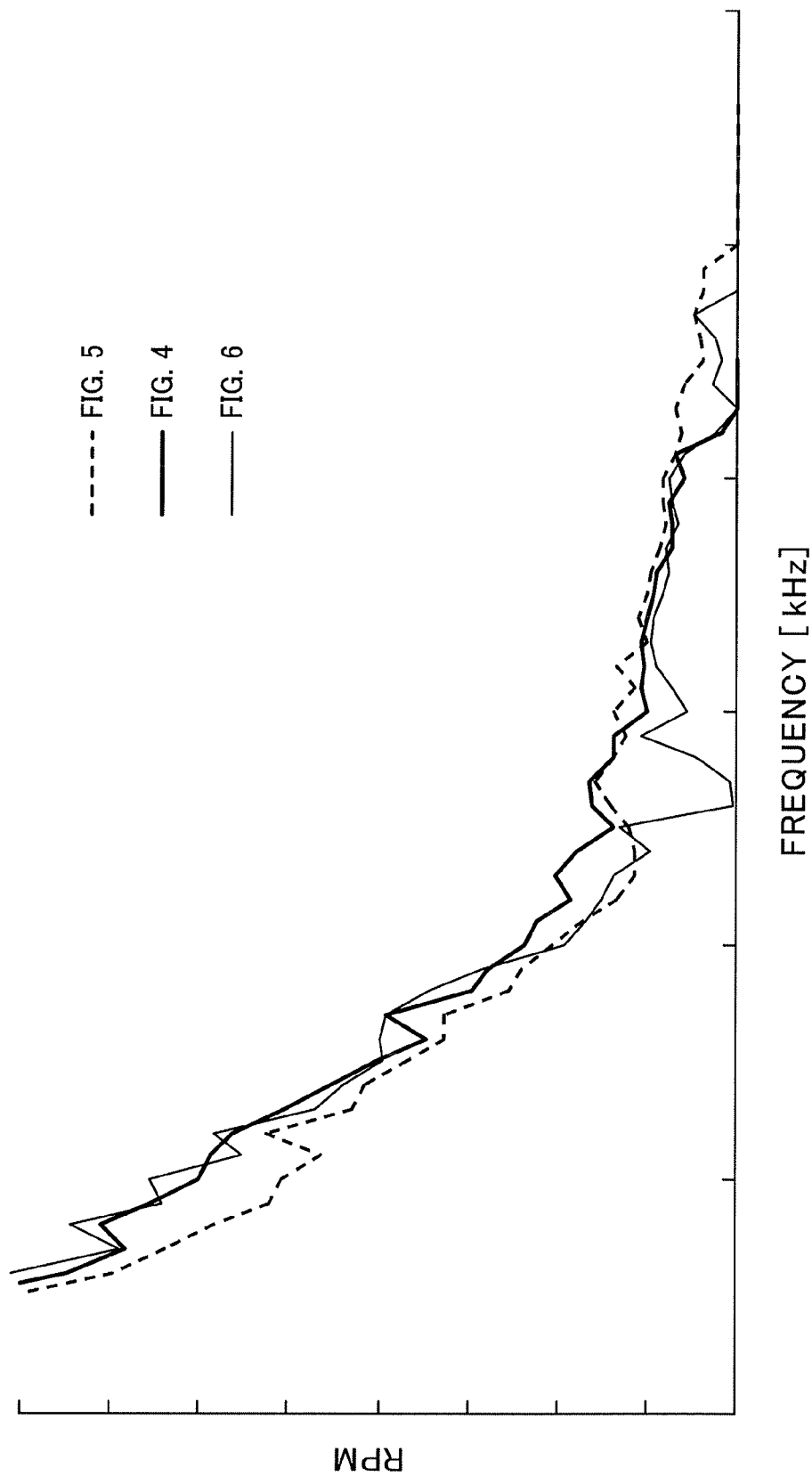

US 8,587,181 B2

PIEZO-ELECTRIC ACTUATOR DRIVE CIRCUIT AND PIEZO-ELECTRIC ACTUATOR DEVICE FURNISHED WITH SAME

BACKGROUND OF THE INVENTION

1. Field of the Invention

The present invention relates to a piezo-electric actuator drive circuit, and more particularly to a piezo-electric actuator drive circuit for driving a piezo-electric actuator wherein a drive voltage is applied to at least one of multiple polarizing sections, and to a piezo-electric actuator device furnished therewith.

2. Description of related art including information disclosed under 37 CFR §§1.97 and 1.98

In piezo-electric actuators such as standing wave ultrasonic motors (piezo motors), multiple polarizing sections are generally formed inside a unitary piezoelectric element, and a voltage pulse from a high-voltage power supply is applied to drive one or more of those polarizing sections. In actuators in which a voltage pulse is applied to one of multiple polarizing sections, the voltage pulse is applied to a different polarizing section in the case when the actuator is caused to rotate positively (positive direction drive) from the case in which the actor is cause to rotate negatively (reverse direction drive). In actuators in which a voltage pulse is applied to multiple polarizing sections, phases mutually differ between the voltage pulse waveforms applied to each polarizing section, and the various voltage pulse waveform phase relationships are changed between the case when the actuator is positively rotated (positive direction drive) and the case when the actuator is negatively rotated (reverse direction drive).

An oscillating actuator is described in Japanese Patent Publication 4406952 (Patent Citation 1). In this oscillating actuator, two alternating current signals are applied to an oscillator, and the slope of the shaft in the trajectory of the elliptical movement of the oscillator is controlled by varying at least one of the voltages of these alternating current signals or by varying the phase.

PRIOR ART REFERENCES

Patent References

Patent Reference 1
Patent Publication 4406952

BRIEF SUMMARY OF THE INVENTION

Problems the Invention Seeks to Resolve

The problem arises, however, that it is difficult to efficiently drive an actuator using the oscillating actuator drive device described in patent publication 4406952. There is a further problem in that drive speed-dependent hunting and the like is prone to occur with this oscillating actuator drive device, making it difficult to smoothly control the actuator.

The present invention seeks to provide a piezo-electric actuator drive circuit capable of efficiently driving a piezo-electric actuator, or of smoothly driving a piezo-electric actuator, and a piezo-electric actuator device furnished with same.

Means for Resolving the Problem

In order to resolve the above-described problems, the present invention is a piezo-electric actuator drive circuit for driving a piezo-electric actuator having multiple polarizing sections, wherein a drive voltage is applied to at least one of the multiple polarizing sections, comprising: multiple phase voltage pulse generating circuits, each of the phase voltage pulse generating circuit being associated with one of the polarizing sections. each of the phase voltage pulse generating circuits includes: a voltage supply; a high-side switching element connected between the polarizing section and the voltage supply, for switching between a conductive state and a non-conductive state using a control signal; a low-side switching element connected between the polarizing section and ground potential, for switching between a conductive state and a non-conductive state in response to a control signal; and a switching element control circuit for outputting the control signals to the high-side switching element and the low-side switching element to control the high-side switching element and the low-side switching element are controlled to apply voltage pulse waveforms to the polarizing section by cyclically switching between a voltage-applied period during which the voltage supply is connected to the polarizing section with only the high-side switching element in a conductive state, a floating period during which the polarizing element is disconnected from the voltage supply and from ground potential with both the high-side switching element and the low-side switching element in a non-conductive state, and a grounded period during which the polarizing section is connected to ground potential with only the low-side switching element in a conductive state.

In the present invention thus constituted, a voltage supply is connected to the polarizing section via a high-side switching element. At the same time, the polarizing element is connected to ground potential via a low-side switching element. Each phase voltage pulse generating circuit applies voltage pulses to the polarizing section by cyclically switching between a voltage-applied period during which the voltage supply is connected to the polarizing section with only the high-side switching element in a conductive state, a floating period during which the polarizing element is disconnected from the voltage supply and from ground potential with both the high-side switching element and the low-side switching element in a nonconductive state, and a grounded period during which the polarizing section is connected to ground potential with only the low-side switching element in a conducting state.

In the present invention thus constituted, a floating period is provided between the voltage-applied period and the grounded period so that the change in voltage applied to the polarizing section can be smooth and the piezoelectric actuator can be efficiently or smoothly driven.

In the present invention, the piezo-electric actuator is preferably configured to have voltages applied to the multiple polarizing sections, and each phase voltage pulse generating circuit applies voltage pulses with respectively differing phases to the multiple polarizing sections.

In the present invention thus constituted, voltage pulses of respectively differing phases are applied to multiple polarizing sections of the piezoelectric actuator, therefore compared to the case in which a voltage pulse is applied to only a single polarizing section, the piezoelectric actuator can be efficiently or smoothly driven.

In the present invention, the switching element control circuit preferably applies voltage pulses in which the floating periods included in the pulses are different to each of the polarizing sections.

In the present invention thus constituted, voltage pulses including differing lengths of the floating period are applied, thereby enabling driving to be appropriately accomplished for the piezoelectric actuator targeted for driving.

In the present invention, the switching element control circuit applies voltage pulses in which the floating period lengths for each of the polarizing sections are the same, and the length of the floating period is varied during driving of the piezo-electric actuator.

In the present invention thus constituted, voltage pulses wherein the length of the floating period is varied during driving of the piezo-electric actuator are applied to each of the polarizing sections, therefore driving appropriate to the state of the piezo-electric actuator can be achieved.

In the present invention each phase voltage pulse generating circuit switches between at least two of the modes selected from a first control mode in which the voltage pulses applied to each polarizing section include same length of the floating period, a second control mode in which the voltage pulses applied to each polarizing section include different floating periods, and a third control mode in which the voltage pulses applied to each polarizing section include floating periods varied during driving of the piezo-electric actuator.

In the present invention thus constituted, the first control mode and second control mode are switched and executed, thus enabling a more efficient and smoother driving of the piezo-electric actuator to be accomplished by switching controls according to the condition in which the first control mode is advantageous and the condition in which the second control mode is advantageous.

In the present invention, the piezo-electric actuator is preferably an ultrasonic motor, and the phase voltage pulse generating circuits also execute a second control mode in which voltage pulse waveforms including identical floating periods are applied to each of the polarizing sections, and wherein the phase voltage pulse generating circuits start to execute the second control mode when the ultrasonic motor reaches a predetermined RPM, subsequent to the startup of the ultrasonic motor.

In the present invention thus constituted, startup characteristics and efficiency can be improved by switching to the first control mode, which has good driving efficiency, after starting up the ultrasonic motor using the second control mode, which has good start-up characteristics.

In the present invention the floating period preferably occupies 5% or more of one cycle of the applied voltage pulse.

In the present invention thus constituted, a sufficient floating period is secured, thus enabling good improvement of driving efficiency.

The present invention furthermore preferably has a coil for generating high voltage to the polarizing section, and the high-side switching element and low-side switching element are connected to the polarizing section through the coil.

In the present invention thus constituted, the resonance phenomenon caused by the coil can be used to apply a voltage higher than that of the voltage supply to the polarizing section. It is therefore possible to drive the piezo-electric actuator using a battery or the like.

The piezo-electric actuator of the present invention also has a rotor, a stator furnished with multiple polarizing sections for driving this rotor, and the piezo-electric actuator drive circuit of the present invention for applying a drive voltage to at least one of the multiple polarizing sections.

Effect of the Invention

The piezo-electric actuator drive circuit and piezo-electric actuator device furnished therewith of the present invention enable efficient driving of the piezo-electric actuator or smooth driving of the piezo-electric actuator.

BRIEF DESCRIPTION OF THE DRAWINGS

FIG. 2:
A circuit diagram and timing chart explaining the action of the A phase voltage pulse generating circuit built into a piezo-electric actuator drive circuit according to an embodiment of the present invention.

FIG. 7:
A graph showing the relationship between rpm and piezo-electric actuator drive circuit current consumption when the piezo-electric actuator rotor is rotated by the piezo-electric actuator drive circuit in an embodiment of the present invention.

FIG. 8:
A graph showing the relationship between voltage pulse waveform frequency and rpm when the piezo-electric actuator rotor is rotated by the piezo-electric actuator drive circuit in an embodiment of the present invention.

DETAILED DESCRIPTION OF THE INVENTION

Next, referring to the attached figures, we discuss preferred embodiments of the present invention.

Figure 1:
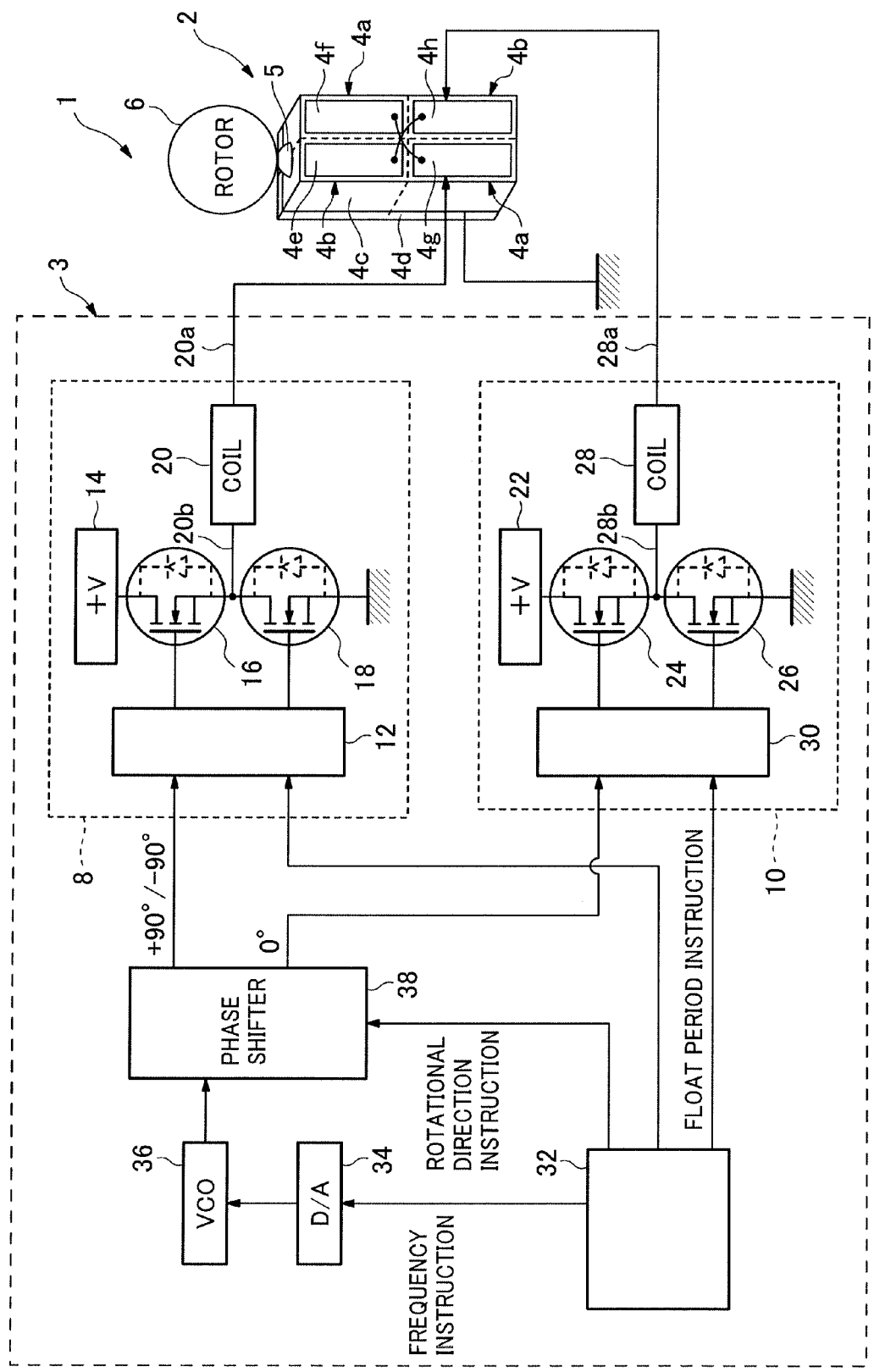
FIG. 1:
A block diagram showing the entirety of a piezo-electric actuator device according to an embodiment of the present invention.
Figure 3:
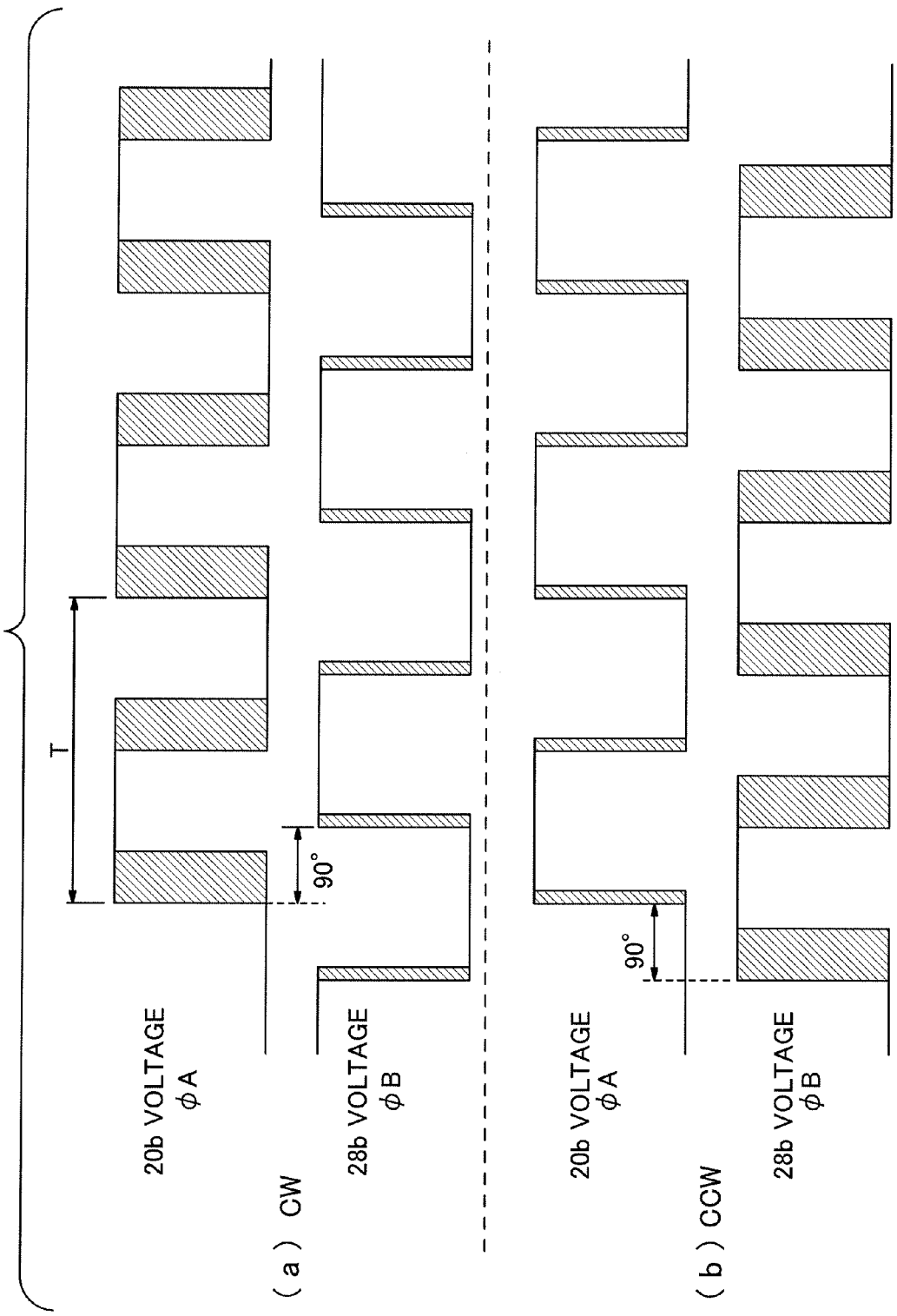
FIG. 3:
A diagram showing the various electrical pulses during positive rotation and negative rotation of the piezo-electric actuator.

First, referring to FIGS. 1 through 3, we discuss a piezo-electric actuator according to an embodiment of the present invention.

FIG. 1 is a block diagram showing the entirety of a piezo-electric actuator device according to a first embodiment of the present invention. FIG. 2 is a circuit diagram and timing chart explaining the action of the A phase voltage pulse generating circuit built into a piezo-electric actuator drive circuit. FIG. 3 is a diagram showing various electrical pulses during positive rotation and negative rotation of the piezo-electric actuator.

As shown in FIG. 1, the piezo-electric actuator device 1 of the present embodiment has a piezo-electric actuator 2 and a piezo-electric actuator drive circuit 3 for driving the piezo-electric actuator 2. The piezo-electric actuator device 1 of the present embodiment is arranged such that driving the multiple polarizing sections provided in the piezo-electric actuator 2 by the piezo-electric actuator drive circuit 3 causes the rotor 6 to turn forward or backward.

As shown in FIG. 1, the piezo-electric actuator 2 has polarizing sections 4a and 4b, a friction member 5, and a rotor 6. The piezo-electric actuator drive circuit 3 also has an A phase voltage pulse generating circuit 8, a B phase voltage pulse generating circuit 10, a microprocessor 32, a D/A converter 34, a piezo-electric control oscillator 36, and a phase shifter 38.

Polarizing sections 4a and 4b are formed inside a single piezo-electric characteristic member; a voltage pulse is applied to the polarizing section 4a by the A phase voltage pulse generating circuit 8, and a voltage pulse is applied to the polarizing section 4b by the B phase voltage pulse generating circuit 10. In the present embodiment, the polarizing sections 4a and 4b comprise a single present embodiment characteristic member 4c, a ground electrode 4d attached to one surface thereof, and four electrodes 4e, 4f, 4g, and 4h attached to the side opposite this ground electrode 4d.

The ground electrode 4d is attached to the piezo-electric characteristic member 4c so as to cover the entirety of one surface of the piezo-electric characteristic member 4c, and is connected to ground potential. Four electrodes 4e, 4f, 4g, and 4h are arrayed and attached on the side of the piezo-electric characteristic member 4c opposite the ground electrode 4d. An electrode 4e disposed at the upper left of FIG. 1 is electrically connected to an electrode 4h disposed at the lower right thereof, and an electrode 4f disposed at the upper right of FIG. 1 is electrically connected to an electrode 4g disposed at the lower left thereof. The upper right part and lower left part of the piezo-electric characteristic member 4c on which the electrodes 4f and 4g are disposed thus function as a polarizing section 4a, and the upper left part and lower right part thereof on which the electrodes 4e and 4h are disposed function as a polarizing section 4b. Note that in the present specification we refer to both the structure in which, as described in this embodiment, multiple polarizing sections are formed within a single piezo-electric characteristic member, and the structure in which a single polarizing section is formed on multiple piezo-electric characteristic members, as "multiple" polarizing sections.

As shown in FIG. 1, the polarizing section 4a is constituted so as to be deformed by the application of an alternating voltage (voltage pulse) in the ultrasound band from the A phase voltage pulse generating circuit 8, and to thereby ultrasonically oscillate. At the same time, the polarizing section 4b is constituted so as to be deformed by the application of an alternating voltage (voltage pulse) in the ultrasound band from the B phase voltage pulse generating circuit 10, and to thereby ultrasonically oscillate. Note that in the present embodiment the piezo-electric actuator 2 is furnished with polarizing sections 4a and 4b only, but the piezo-electric actuator drive circuit of the present invention may also be applied to piezo-electric actuators with multiple sets of polarizing sections.

The friction member 5 is a protuberance under pressure relative to the rotor 6, and is arranged to oscillate together with the oscillation of the piezo-electric characteristic member. When the friction member 5 is oscillated, the rotor 6 being pushed thereby is rotated in a predetermined direction.

The microprocessor 32 is constituted to output to the D/A converter 34 a frequency instruction signal instructing the frequency of the voltage pulse waveform output from the A phase voltage pulse generating circuit 8 and the B phase voltage pulse generating circuit 10. The frequency of the piezo-electric actuator 2 rotor 6 is controlled by the frequency of this voltage pulse waveform. The microprocessor 32 is constituted to output to the phase shifter 38 a positive/negative rotation instruction signal instructing the positive or negative rotation of the rotor 6. The phase relationship between the two drive signals output from the phase shifter 38 is changed by this positive/negative rotation instruction signal, switching the rotational direction of the rotor 6. Furthermore, the microprocessor 32 is constituted to output to the A phase voltage pulse generating circuit 8 and the B phase voltage pulse generating circuit 10 a floating period instruction signal instructing the length of the floating period included in the voltage pulse output from the A phase voltage pulse generating circuit 8 and the B phase voltage pulse generating circuit 10. The voltage pulse floating period is discussed below.

The D/A converter 34 is constituted to convert the digital signal input from the microprocessor 32 into an analog signal. As described above, the digital signal input from the microprocessor 32 is a frequency instruction signal for instructing the frequency of the voltage pulse; and the D/A converter 34 is constituted to output an analog signal in response to the instructed frequency.

The piezo-electric control oscillator 36 is an oscillator in which oscillation frequency is varied according to the voltage applied; it is constituted so that a rectangle wave (voltage pulse waveform) with a frequency corresponding to the voltage signal input from the D/A converter 34 is output to the phase shifter 38.

The phase shifter 38 is constituted to produce a voltage pulse waveform with a phase shifted 90° from the voltage pulse wave input from the piezo-electric control oscillator 36. In the present embodiment, the phase shifter 38 is constituted to output, as is, the voltage pulse waveform input from the piezo-electric control oscillator 36 to the B phase voltage pulse generating circuit 10, and to output as a drive signal a voltage pulse waveform offset by 90° from this waveform to the A phase voltage pulse generating circuit 8. In the present embodiment the phase shifter 38, using the positive/negative rotation instruction signal input from the microprocessor 32, causes the phase of the voltage pulse waveform output to the A phase voltage pulse generating circuit 8 to advance 90° when a "positive rotation" instruction is given; when a "negative rotation" is instructed, the voltage pulse waveform phase is caused to lag by 90°.

Note that the phase difference between the A and B phase voltage pulses may be a phase difference other than the ±90°.

The A phase voltage pulse generating circuit 8 has a switching element control circuit 12, a high voltage power supply 14 serving as voltage supply, a high-side switching element 16, a low-side switching element 18, and a coil 20.

The switching element control circuit 12 is constituted to switch the high-side element 16 and the low-side switching element 18 into a conductive state or a non-conductive state based on the ultrasonic band drive signal and the floating period instruction signal. Specifically, the switching element control circuit 12 comprises various logic ICs and the like.

The high voltage power supply (voltage supply) 14 is a voltage supply for generating a positive high voltage, connected to the high-side switching element 16. When the high-side switching element 16 is switched into a conducting state, the high voltage is applied to the drive element through the coil 20.

The high-side switching element 16 in the present embodiment comprises an N-channel MOSFET (Metal-Oxide-Semiconductor Field-Effect Transistor); the gate terminal thereof is connected to the switching element control circuit 12, while the drain terminal is connected to the high voltage power supply 14, and the source terminal is connected to the coil 20.

The low-side switching element 18 in the present embodiment comprises an N-channel MOSFET; the gate terminal thereof is connected to the switching element control circuit 12, while the drain terminal is connected to the coil 20 and the source terminal is connected to ground.

The coil 20 is connected via drive terminal 20a serving as the first terminal thereof to the polarizing section 4a; the second terminal 20b thereof, as previously described, is connected to the source terminal of the high-side switching element 16 and the drain terminal of the low-side switching element 18. Here, the polarizing section 4a connected to the coil 20 acts as an LC resonance circuit, and an inductance value is selected for the coil 20 so that an appropriate high voltage is generated on the drive terminal 20a in the resonant frequency region of the piezo-electric actuator 2.

The B phase voltage pulse generating circuit 10 has a high voltage power supply 22, a high-side switching element 24, a low-side switching element 26, a coil 28, and a switching element control circuit 30. Note that because the B phase voltage pulse generating circuit 10 is the same as the A phase voltage pulse generating circuit 8 described above, we omit an explanation thereof here. In FIG. 1 the high voltage power supply 14 and the high voltage power supply 22 were separately depicted, but these may also be constituted as the same high voltage power supply.

Next, referring to FIG. 2, we discuss the action of the A phase voltage pulse generating circuit 8 built into the piezoelectric actuator drive circuit 3. In FIG. 2, (a) shows the A phase voltage pulse generating circuit 8, and (b) is a timing chart showing the action of the A phase voltage pulse generating circuit 8. The FIG. 2 (b) timing chart shows, sequentially starting from the top, a drive signal, the state of the high-side switching element 16, the state of the low-side switching element 18, and the voltage on the coil 20 second terminal 20b.

First, the rectangular waveform-shaped drive signal shown on the top row of FIG. 2(b) is input to the switching element control circuit 12. The drive signal is selected to be at a frequency close to the resonant frequency of the piezo-electric actuator 2, and so that an appropriate high voltage is generated on the drive terminal 20a.

As shown in FIG. 2(b), the switching element control circuit 12 places the high-side switching element 16 in a non-conducting state (off) and the low-side switching element 18 in a conducting state (on) when the drive signal is at an L level. Specifically, the switching element control circuit 12 sends signals to each of the gate terminals of the high-side switching element 16 and the low-side switching element 18, switching the FETs therein on and off. When the high-side switching element 16 is turned off and the low-side switching element 18 is turned on, the coil 20 second terminal 20b is grounded through the low-side switching element 18, and therefore goes to 0V.

Next, when the drive signal is raised from an L level to an H level, the low-side switching element 18 is immediately switched to off, and the high-side switching element 16 is switched to on after the elapse of a floating period T1 in response to the floating period instruction signal from the microprocessor 32. When the low-side switching element 18 is switched to off and the high-side switching element 16 is switched to on, the coil 20 second terminal 20b is connected via the high-side switching element 16 to the high voltage power supply 14, and the second terminal 20b terminal voltage rises to the voltage of the high voltage power supply 14.

During the floating period T1, after the low-side switching element 18 is turned off until the high-side switching element 16 is turned on, the low-side switching element 18 and the high-side switching element 16 are both off, and during this floating period T1 (the diagonally shaded portion in FIG. 2(b)), the coil 20 second terminal 20b is in a floating state, electrically isolated from the high voltage power supply 14 and from ground potential and, due to the FET parasitic diode effect, the second terminal 20b voltage goes to a value dependent on the drive terminal 20a potential and the current direction and current value of the coil 20, within a voltage range from ground potential to the high voltage power supply voltage.

To continue, when the drive signal is dropped from an H level to an L level, the high-side switching element 16 is immediately switched to off, and the low-side switching element 18 is switched to on after the elapse of a predetermined floating period T1. When the high-side switching element 16 is turned off and the low-side switching element 18 is turned on, the coil 20 second terminal 20b is grounded through the low-side switching element 18, and therefore again goes to 0V.

After the high-side switching element 16 is switched to off, the coil 20 second terminal 20b is placed in a floating state, electrically isolated from the high voltage power supply 14 and ground potential during the floating period T1, until the low-side switching element 18 is switched on. This floating period T1 is also set according to the floating period instruction signal.

By repetition of the above actions, cyclical switching is accomplished between a voltage-applied period in which a voltage is applied to the second terminal 20b with only the high-side switching element 16 in a conducting state, a floating period in which the second terminal 20b potential is placed at the floating potential with both the high-side switching element 16 and the low-side switching element 18 in a non-conducting state, and a grounded state in which the second terminal 20b is placed at ground potential with only the low-side switching element 18 in a conducting state, thereby applying a voltage pulse to the polarizing section 4a. In other words, during the period in which a voltage is applied, the high voltage power supply 14 is connected via the coil 20 to the polarizing section 4a; during the grounded period, the polarizing section 4a is connected to ground potential via the coil 20; and during the floating period, the polarizing section 4a is in a floating state, isolated from the high voltage power supply 14 and ground potential. Resonance by the voltage pulse with the inductance of coil 20 and the capacitive component of the polarizing section 4a results in a pulse-shaped high voltage being applied to the polarizing section 4a, vibrationally deforming the piezo-electric characteristic member 4c.

The constitution and action of the B phase voltage pulse generating circuit 10 built into the piezo-electric actuator drive circuit 3 is identical to that of the A phase voltage pulse generating circuit 8, hence an explanation thereof is here omitted. Note that in the present embodiment a rectangle wave with a phase 90° offset from the A phase voltage pulse generating circuit 8 drive signal is input as a drive signal to the B phase voltage pulse generating circuit 10, therefore the voltage pulse generated by the B phase voltage pulse generating circuit 10 is 90° offset in phase from the voltage pulse generated by the A phase voltage pulse generating circuit 8. The floating periods included in the voltage pulse waveform are independently set for the A phase voltage pulse generating circuit 8 and the B phase voltage pulse generating circuit 10 by the floating period instruction signal input from the microprocessor 32. Therefore the length of the floating periods included in the voltage pulse waveforms respectively output from the two voltage pulse generating circuits are respectively freely set.

Next, referring to FIG. 3, we discuss an example of the voltage pulse waveforms output by the A phase voltage pulse generating circuit 8 and the B phase voltage pulse generating circuit 10. FIG. 3(a) is an example of a voltage pulse waveform when the piezo-electric actuator 2 rotor 6 is rotated positively; FIG. 3(b) is an example of a voltage pulse waveform when the rotor 6 is rotated negatively. Note that the voltage pulse waveform output from the A phase voltage pulse generating circuit 8 indicates the voltage on the coil 20 second terminal 20b, and the voltage pulse waveform output from the B phase voltage pulse generating circuit 10 indicates the voltage on the coil 28 second terminal 28b.

As shown in FIG. 3(a), when the rotor 6 in the present embodiment is rotated positively, the phase of the voltage pulse waveform output from the A phase voltage pulse generating circuit 8 is advanced by 90° relative to the voltage pulse waveform output from the B phase voltage pulse generating circuit 10. In the example shown in FIG. 3(a), the A phase floating period is set to be longer than the B phase floating period.

As shown in FIG. 3(b), on the other hand, when the rotor 6 is rotated negatively, the phase of the voltage pulse waveform output from the A phase voltage pulse generating circuit 8 lags by 90° relative to the voltage pulse waveform output from the B phase voltage pulse generating circuit 10. Also, in the example shown in FIG. 3(b), the A phase float period is set to be shorter than the B phase floating period, which is opposite the positive rotation case shown in FIG. 3(a).

The floating period included in the voltage pulse waveform is set at 5-25% of one voltage pulse waveform cycle, and more preferably to 10-20% thereof during both voltage pulse rises and falls. Or, the floating period included in the voltage pulse waveform is set at 0.7-4 μsec, and more preferably to 1.5-3 μsec, during voltage pulse rises and falls.

Next, referring to FIGS. 4 through 8, we discuss the action of the piezo-electric actuator device 1 according to the present embodiment of the present invention.

Figure 4:
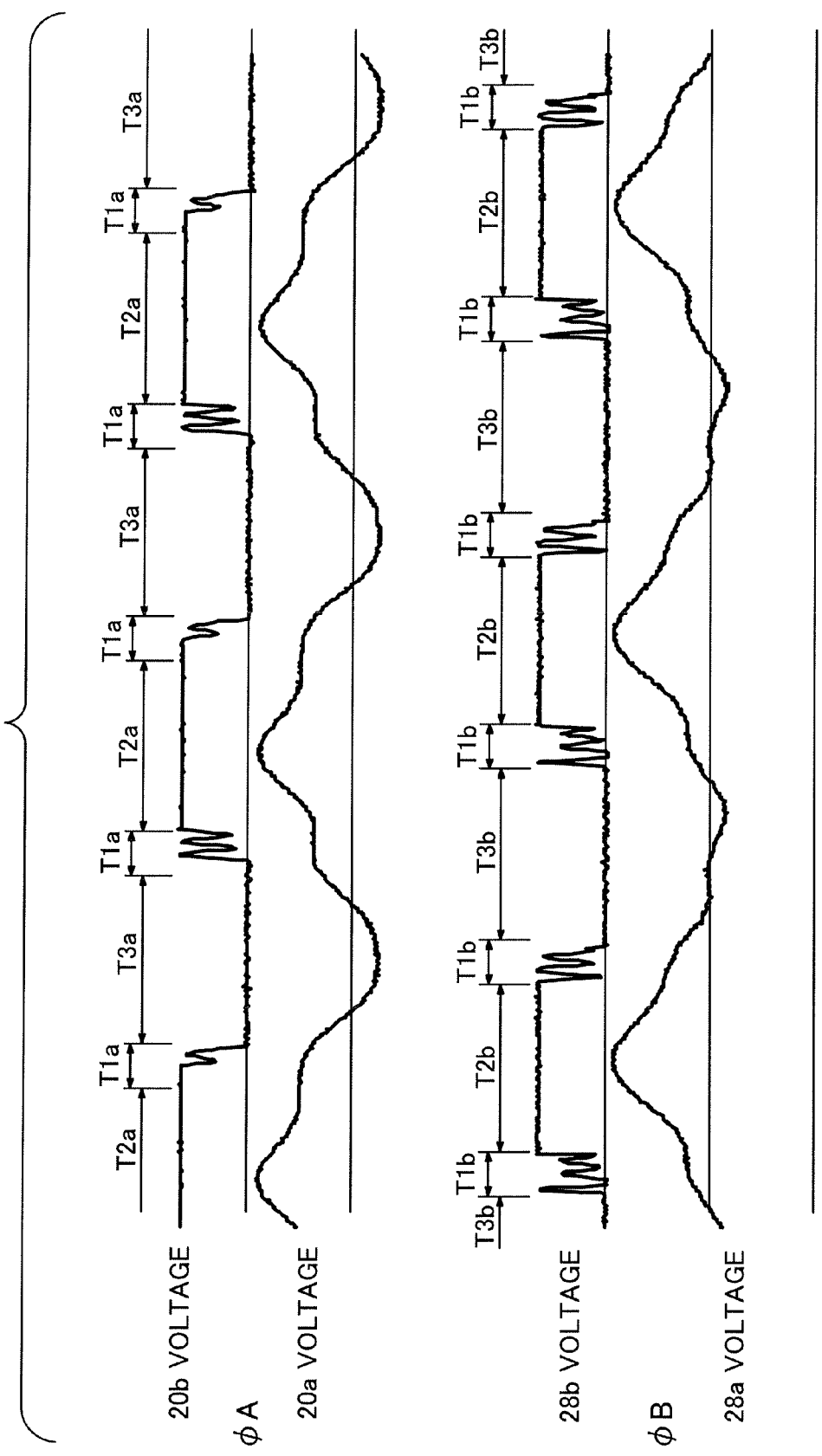
FIG. 4:
An electrical pulse waveform when the floating periods are the same in the A phase voltage pulse generating circuit and the B phase voltage pulse generating circuit.

FIG. 4 shows a voltage pulse waveform when the A phase voltage pulse generating circuit 8 and the B phase voltage pulse generating circuit 10 have the same floating period; shown in sequence from the top down are the voltage on the drive terminal 20a and the voltages on the second terminal 28b and the drive terminal 28a of the coil 28. In the present specification, this type of voltage pulse waveform is referred to as a symmetrical floating period waveform.

Figure 5:
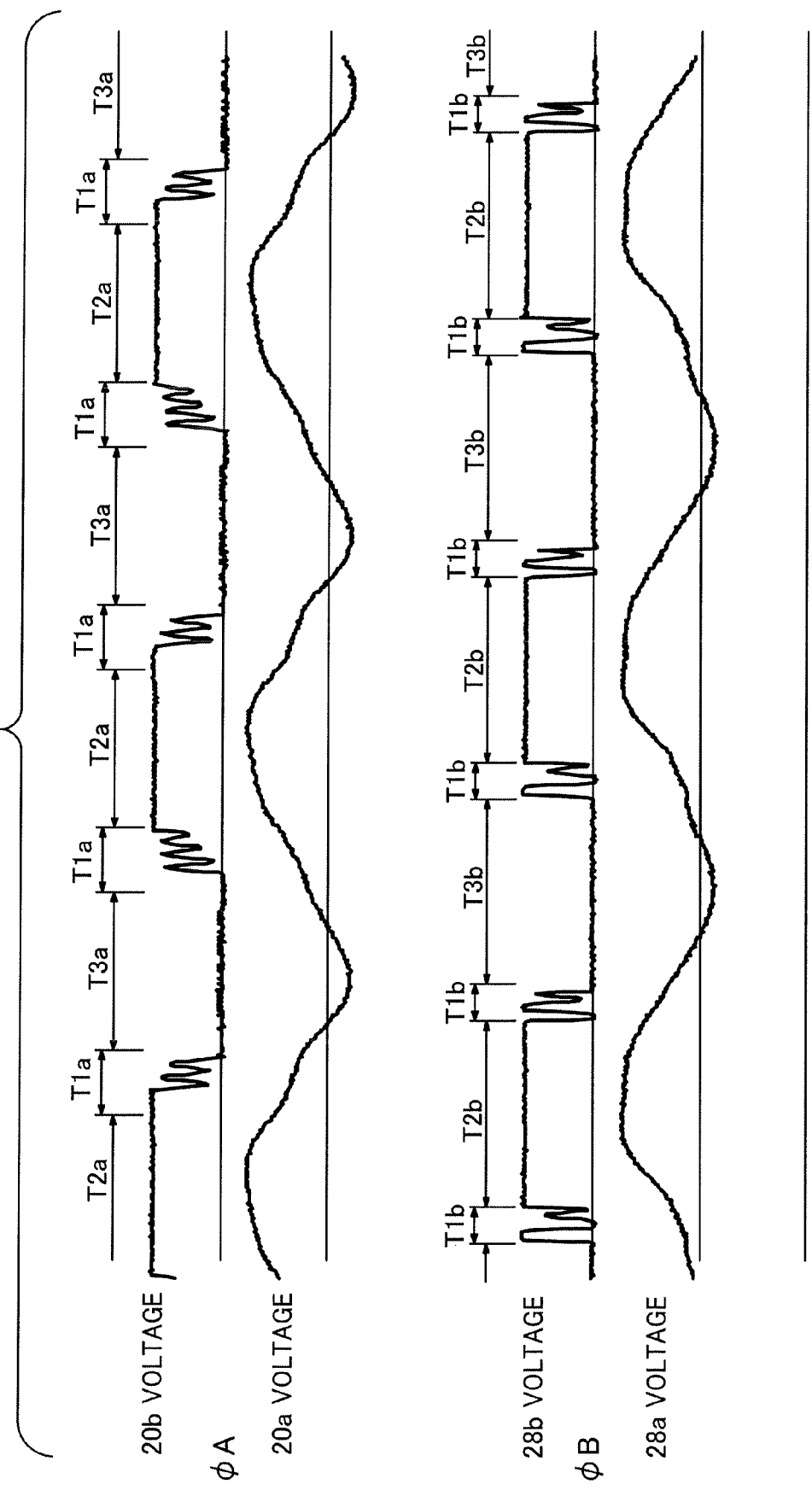
FIG. 5:
A voltage pulse waveform resulting when the B phase voltage pulse generating circuit floating period is made shorter than the A phase voltage pulse generating circuit floating period.

FIG. 5 shows a voltage pulse waveform when the B phase voltage pulse generating circuit 10 floating period is made shorter than the A phase voltage pulse generating circuit 8 floating period; as in FIG. 4 it shows, from the top down, the voltages on terminals 20b, 20a, 28b, and 28a. In the present specification, this type of voltage pulse waveform is referred to as an asymmetrical floating period waveform.

Figure 6:
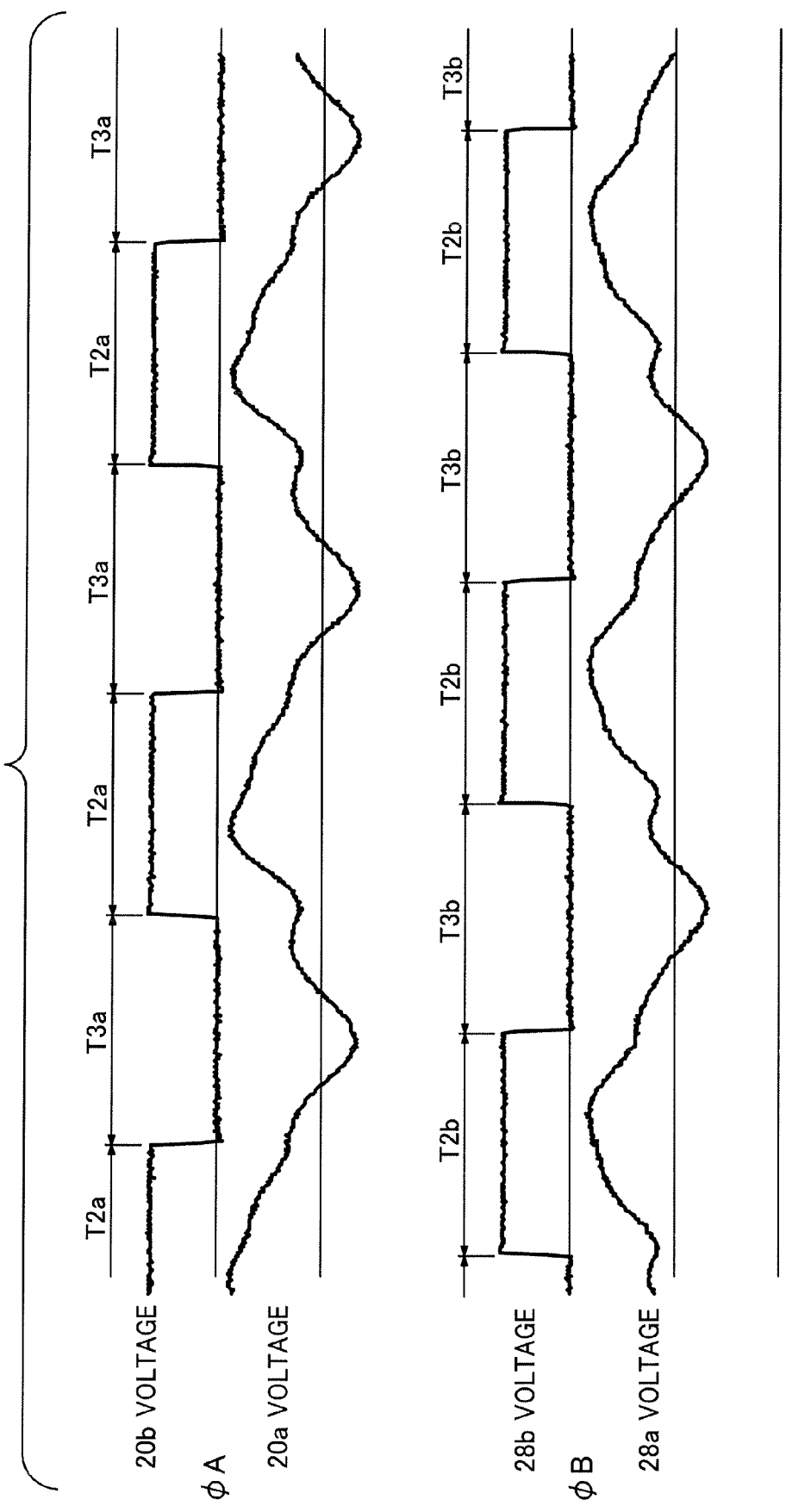
FIG. 6:
A voltage pulse waveform resulting when no floating period is provided for either the A phase voltage pulse generating circuit floating period or the B phase voltage pulse generating circuit floating period, shown for comparison purposes.

FIG. 6 is a comparative example of a voltage pulse waveform when no floating period is provided for the A phase voltage pulse generating circuit 8 and the B phase voltage pulse generating circuit 10, showing from the top down, as in FIG. 4, the voltages on the terminals 20b, 20a, 28b, and 28a. In the present specification, this type of voltage pulse waveform is referred to as a conventional voltage pulse waveform.

Note that a dead time is generally provided in circuits in which two switching elements are connected in series between a voltage supply and ground potential, and these switching elements are switched to create a voltage pulse waveform. This dead time provides period during which each switching element connected between the voltage supply and ground potential is simultaneously on and, to prevent shorting of the voltage supply and ground potential, the two switching elements simultaneously turn off. I.e., when switching from a state in which only the high-side switching element is in an on state to one in which only the low-side switching element is in an on state, the high-side switching element is first turned off, then after both switching elements have been turned off, the low-side switching element is switched to on. Provision of this type of dead time, during which both switching elements are off, is unavoidably for normal circuit operation; it is ideally 0 for accurate output of a voltage pulse waveform. Therefore in actual implemented circuits, dead time is set to the minimum necessary length, and is normally set at an extremely short period of about 300 nsec.

In FIG. 6, as well, deadtime is set to approximately 300 nsec. On the other hand, in the floating period of the present embodiment of the invention, the period during which the high-side switching element and the low-side switching element are simultaneously off is similar to dead time. However, the floating period is intentionally set in order to improve control characteristics of the piezo-electric actuator 2, while at the same time that period is set at many multiples of the normal dead time, so in the present embodiment we distinguish this by referring to it as float time.

First, as shown in FIG. 4, the voltage pulse waveform on the coil 20 second terminal 20b is at ground potential for the ground period T3a during which only the low-side switching element 18 is on, while during the voltage-applied period T2a when only the high-side switching element 16 is on, that voltage pulse waveform is equal to the high voltage power supply 14 voltage. In contrast, during the floating period T1 a positioned between the grounded period T3a and the voltage-applied period T2a, the second terminal 20b is in a floating state, therefore due to the FET parasitic diode effect, the second terminal 20b goes to a potential dependent on the coil 20 drive terminal 20a potential and the coil 20 current direction and current value, varying in an oscillating manner.

On the other hand, the voltage waveform on the coil 20 drive terminal 20a is generally a waveform with a high voltage during the voltage-applied period T2a period, and a low-trending voltage during the grounded period T3a, but the waveform is complex due to the resonance, etc. of the coil 20 and the polarizing section 4a. This is because, due to the FET parasitic diode effect, the potential of the second terminal 28b depends on the potential of the coil 28 drive terminal 28a and the direction of the current and current value of the coil 28.

Furthermore, the voltage pulse waveform at the coil 28 second terminal 28b also has the same tendency as the second terminal 20b voltage pulse waveform, but notwithstanding that the length of the set floating period T1b is identical to that of the floating period T1a, the waveform during the floating period T1b differs from that at the second terminal 20b. This is because the potential at the second terminal 28b depends on the potential at the drive terminal 28a. The coil 28 drive terminal 28a voltage pulse waveform also has a similar tendency to the drive terminal 20a voltage pulse waveform, but differs from the drive terminal 20a.

Note that in the symmetrical floating period waveform shown in FIG. 4, the floating periods T1a and T1b are 1.52 μsec, and the voltage-applied period T2a and T2b and grounded periods T3a and T3b are 5.76 μsec.

Next, in the voltage pulse waveform shown in FIG. 5, 10 floating period T1b caused by the B phase voltage pulse generating circuit 10 is made shorter than the floating period T1a caused by the A phase voltage pulse generating circuit 8.

Also, the drive terminal 20a waveform and the drive terminal 28a waveform are smoother, approaching a sine wave.

Note that in the asymmetrical floating period waveform shown in FIG. 5, the floating period T1a is 2.92 μsec, the voltage-applied period T2a and the grounded period T3a are 4.36 μsec, the floating period T1b is 1.24 μsec, and the voltage-applied period T2b and grounded period T3b are 6.04 μsec.

Next, as a comparative example, in the conventional voltage pulse waveform shown in FIG. 6, the second terminals 20b and 28b have accurate rectangle waves in which the voltage-applied period T2 and the grounded period T3 alternately appear. Note that a dead time during which the high-side and low-side switching elements are simultaneously turned off is also provided in the voltage pulse waveform shown in FIG. 6, but because this is extremely short compared to the floating period, the effect thereof does not appear in the voltage pulse waveform.

On the other hand, in FIG. 6 the drive terminal 20a waveform and the drive terminal 28a waveform are more uneven compared to the voltage waveforms shown in FIGS. 4 and 5. In particular, at the instant when the potential on the second terminals 20b and 28b rises from ground to high voltage power supply potential, the drive terminal potential, which had been increasing, temporarily drops, then resumes increasing. This is thought to be because in the comparative example in which no floating period is provided, the potential on the second terminals 20b and 28b is constantly restricted to either ground or the potential of the high voltage power supply, so that the potentials of drive terminals 20a and 28a are affected, thus becoming uneven distorted.

In contrast, in the examples shown in FIGS. 4 and 5, because a floating period of a predetermined length is provided during the interval when the potential is switched between ground potential and high voltage power supply potential, the second terminals 20b and 28b can freely assume a potential within the range between ground and the high voltage power supply voltage. It is therefore thought that the potential of the drive terminal on each coil will not assume a complex waveform as the result of a disturbance under the effect of the potential on the second terminal.

Next, referring to FIGS. 7 and 8, we discuss the results of controlling the piezo-electric actuator 2 using the piezo-electric actuator drive circuit 3 in an embodiment of the present invention.

FIG. 7 is a graph showing the relationship between rpm and piezo-electric actuator drive circuit 3 current consumption when the rotor 6 of the piezo-electric actuator 2 serving as ultrasonic motor is rotated by the piezo-electric actuator drive circuit 3 of the present embodiment. In the FIG. 7 graph, the result of driving the piezo-electric actuator 2 with the symmetrical floating period waveform shown in FIG. 4 is indicated by the heavy solid line, and the result from the asymmetrical floating period waveform shown in FIG. 5 is indicated by the dotted line; as a comparative example, the result from the conventional voltage pulse waveform shown in FIG. 6 is indicated by the light solid line.

As is clear from FIG. 7, in the piezo-electric actuator drive circuit 3 of the present embodiment, when the piezo-electric actuator 2 is driven by the symmetrical floating period waveform or by the asymmetrical floating period waveform, consumed current increases essentially monotonically as rpm increases. In contrast, when driven by the conventional voltage pulse waveform shown in FIG. 6, consumed current is greater across the whole range than with the piezo-electric actuator drive circuit 3 of the present embodiment, and drive efficiency of the piezo-electric actuator 2 is clearly poor. When driven with a conventional voltage pulse waveform, there is clearly a region in which, at low rpm, the drive current is extremely large. As shown in FIG. 6, a large disturbance appears on the drive terminal in the conventional voltage pulse waveform, which is believed to induce an extraordinary drop in efficiency at a certain frequency.

Moreover, if the current consumed by the symmetrical floating period waveform indicated by the heavy solid line is compared with that of the asymmetrical floating period waveform indicated by the dotted line, both consume about the same current, but in the high rpm region the current consumed by the asymmetrical floating period waveform indicated by the dotted line is slightly greater. In other words, in a predetermined high rpm region, the symmetrical floating period waveform, which has the same floating period in both the A phase voltage pulse generating circuit and the B phase voltage pulse generating circuit, has slightly better drive efficiency.

FIG. 8 is graph showing the relationship between voltage pulse waveform frequency and rpm when the piezo-electric actuator 2 rotor 6 is rotated by the piezo-electric actuator drive circuit 3 in the present embodiment. In the FIG. 8 graph, the result of driving the piezo-electric actuator 2 with the symmetrical floating period waveform shown in FIG. 4 is indicated by the heavy solid line, and the result from the asymmetrical floating period waveform shown in FIG. 5 is indicated by the dotted line; as a comparative example, the result from the conventional voltage pulse waveform shown in FIG. 6 is indicated by the light solid line.

As shown in FIG. 8, in the piezo-electric actuator 2 there is a tendency for rpm to increase as the frequency of the voltage pulse waveform declines. Therefore when starting from a state in which the piezo-electric actuator 2 is stopped, the frequency of the voltage pulse waveform is gradually caused to decrease from a high frequency. As is clear from FIG. 8, the rotation of the rotor 6 from the highest voltage pulse waveform frequency value starts in the asymmetrical floating period waveform shown by the dotted line, for which the floating periods included in the A phase voltage pulse generating circuit and the B phase voltage pulse generating circuit differ. In the dotted line graph, rpm rises essentially monotonically with the drop in the frequency of the voltage pulse waveform at low speeds after the rotor 6 begins to rotate, making it easy to execute control of rotor 6 rpm, which is particularly advantageous for controlling the stopping position.

The next time the rotor 6 starts rotating from a high frequency is during the conventional voltage pulse waveform shown by the light solid line. However, there is a region in the light solid line graph in which rpm drops to almost 0 when the frequency is dropping. In other words, in a conventional voltage pulse waveform, the rotor 6 in some cases stops when an attempt is made to drive the piezo-electric actuator 2 at a certain frequency, making it difficult to freely control the rotor 6 rpm.

In the symmetrical floating period indicated by the heavy solid line in FIG. 8, the rotor 6 does not begin to rotate down to the lowest frequency, or the rpm when it does begin to rotate is high compared to other waveforms, so that controllability in the low speed region is inferior to the asymmetrical floating period waveform, but after rotation is begun, rpm increases monotonically with the decline in frequency, and good controllability is exhibited.

As shown in FIG. 7, control using the symmetrical floating period waveform shown in FIG. 4 is optimal for piezo-electric actuator 2 drive efficiency. Also, as shown in FIG. 8, control using the asymmetrical floating period waveform shown in FIG. 5 is optimal for piezo-electric actuator 2 drive startup characteristics. Therefore an even better piezo-electric actuator drive circuit 3 can be constituted by switching between execution of a first mode using a symmetrical floating period waveform and a second control mode using an asymmetrical floating period waveform.

In particular, good controllability and high drive efficiency can be achieved by controlling to switch to the first control mode using the symmetrical floating period waveform shown in FIG. 4 after the piezo-electric actuator 2 is started by the second control mode using the asymmetrical floating period waveform, thereby causing the voltage pulse waveform to decline to a predetermined frequency and raising the rpm.

In the piezo-electric actuator device 1 of the present embodiment of the invention, a floating period T1 is provided between the voltage-applied floating period T2 and the grounded period T3 (FIGS. 4 and 5), thus making the change in voltage applied to the polarizing sections 4a and 4b gradual, so the piezo-electric actuator 2 can be efficiently and smoothly driven.

In the piezo-electric actuator device 1 of the present embodiment of the invention, voltage pulses of respectively differing phases are applied to the piezo-electric actuator 2 polarizing sections 4a and 4b, therefore compared to the case in which voltage pulses are applied to only a single polarizing section, the piezo-electric actuator 2 can be efficiently and smoothly driven.

In the piezo-electric actuator device 1 of the present embodiment of the invention, pulses of respectively differing floating period lengths can be applied to the polarizing sections 4a and 4b, so that driving can be appropriately matched to the piezo-electric actuator 2 targeted for driving.

The piezo-electric actuator device 1 of the present embodiment of the invention enables switching between a first control mode using a symmetrical floating period waveform and a second control mode using an asymmetrical floating period waveform, therefore the piezo-electric actuator can be more efficiently and smoothly driven by switching the control according to whether the system is in a drive state in which the first mode is advantageous or a drive state in which the second control mode is advantageous.

In the piezo-electric actuator device 1 of the present embodiment of the invention, startup characteristics and efficiency can be improved by switching to the first control mode, which has good drive characteristics, after starting up the ultrasonic motor using the second control mode, which has good start-up characteristics.

In the piezo-electric actuator device 1 of the present embodiment of the invention, the provision of a floating period occupying approximately 10% of a voltage pulse cycle, which is far longer than the deadtime included in the voltage pulses from a normal drive circuit, enables fully adequate improvement in the drive efficiency of the voltage actuator drive circuit.

In the piezo-electric actuator device 1 of the present embodiment of the invention, the high-side switching elements 16 and 24 and the low-side switching elements 18 and 26 are connected to the polarizing sections 4a and 4b via the coils 20 and 28, therefore a voltage higher than the voltage on the high voltage power supplies 14 and 22 can be applied to the polarizing sections 4a and 4b by taking advantage of the resonance phenomenon on the coils 20 and 28. Thus in piezo-electric actuator drive circuits of the type in which a coil is connected between a switching element and a polarizing section, there is a tendency for the output impedance of the drive circuit to be high due to the interposition of the coil, however in the piezo-electric actuator drive circuit of the present embodiment, the provision of a floating period in the piezo-electric pulse waveform enables the suppression of coil-originating deleterious effects such as electromotive force or, alternatively enables the efficient driving of the piezo-electric actuator using coil-originating electromotive force.

We have described above a preferred embodiment of the present invention, but various changes can be added to the above-described embodiment. In particular, in the above-described embodiment the piezo-electric actuator drive circuit was used to drive the piezo-electric actuator driving the rotor, but the piezo-electric actuator drive circuit can be applied to the driving of any desired piezo-electric actuator such as a linear actuator or the like.

Also, in the above-described embodiment, the piezo-electric actuator drive circuit was constituted to be capable of driving positive and negative rotation, but the present invention can also be applied to a piezo-electric actuator drive circuit capable of driving in only one direction.

Moreover, in the above-described embodiment the piezo-electric actuator drive circuit applied voltage pulse waveforms of differing phases to two polarizing sections, but the present invention may also be applied to a piezo-electric actuator drive circuit for applying a voltage pulse waveform to only a single polarizing section.

In the above-described present embodiment a coil was connected between the switching element and the polarizing section, but the present invention may also be applied to a piezo-electric actuator drive circuit in which no coil is provided.

Furthermore, in the above-described embodiment the drive element was driven using a positive high voltage power supply, but a negative high voltage power supply could also be used as the high voltage power supply. In the above-described embodiment an N-channel MOSFET was used as the switching element, but depending on high voltage power supply considerations such as polarity, etc., a P-channel MOSFET may also be used as the MOSFET switching element.

In the above-described embodiment control was exercised on a piezo-electric actuator in which multiple polarizing sections are formed within a single piezo-electric characteristic member, but it is possible to apply the present invention to various types of actuators, such as those in which the polarizing sections are divided into multiple layers, and ground electrodes are alternately layered with drive electrodes.

Moreover, in the above-described embodiment the symmetrical floating period waveform and asymmetrical floating period waveform had a certain floating period at all times, but a variation is also possible in which the floating period is changed during driving of the piezo-electric actuator. For example, in a symmetrical floating period waveform, control can be exercised to extend or shorten the floating period during driving while maintaining the same floating period in the A phase and B phase.

It is also possible to switch as appropriate between a third control mode for varying the floating period during driving and, as described above, a first control mode using a symmetrical floating period waveform and a second control mode using an asymmetrical floating period waveform.

DESCRIPTION OF REFERENCE NUMERALS

1: piezo-electric actuator device
2: piezo-electric actuator
3: piezo-electric actuator drive circuit
4a, 4b: polarizing sections
5: friction member
6: rotor
8: A phase voltage pulse generating circuit 8

10: B phase voltage pulse generating circuit 10
12: switching element control circuit
14: high voltage power supply
16: high-side switching element
18: low-side switching element
20: coil
20a: drive terminal
20b: second terminal (first terminal)
22: high voltage power supply (voltage supply)
24: high-side switching element
26: low-side switching element
28: coil
28a: drive terminal (first terminal)
28b: second terminal
30: switching element control circuit
32: microprocessor
34: D/A converter
36: piezo-electric control oscillator
38: phase shifter

The invention claimed is:

1. A piezo-electric actuator drive circuit for driving a piezo-electric actuator having multiple polarizing sections to which drive voltages are applied, comprising:
multiple phase voltage pulse generating circuits, each of the phase voltage pulse generating circuit being associated with one of the polarizing sections and including:
a voltage supply;
a high-side switching element connected between the polarizing section and the voltage supply, for switching between a conductive state and a non-conductive state in response to a control signal;
a low-side switching element connected between the polarizing section and ground potential, for switching between a conductive state and a non-conductive state in response to a control signal; and
a switching element control circuit for outputting the control signals to the high-side switching element and the low-side switching element to control the high-side switching element and the low-side switching element to apply voltage pulse waveforms to the polarizing section by cyclically switching between a voltage-applied period during which the voltage supply is connected to the polarizing section with only the high-side switching element in a conductive state, a floating period during which the polarizing element is disconnected from the voltage supply and from ground potential with both the high-side switching element and the low-side switching element in a non-conductive state, and a grounded period during which the polarizing section is connected to ground potential with only the low-side switching element in a conductive state;
wherein the multiple phase voltage pulse generating circuits apply voltage pulse waveforms with respectively differing phases to the multiple polarizing sections, and execute a first control mode in which voltage pulse waveforms including different floating periods are applied to each of the polarizing sections.

2. The piezo-electric actuator drive circuit of claim 1, wherein the floating period occupies 5% or more of one cycle of the applied voltage pulse.

3. The piezo-electric actuator drive circuit of claim 1, further comprising a coil for generating a high voltage to the polarizing section, wherein the high-side switching element and low-side switching element are connected to the polarizing section through the coil.

4. A piezo-electric actuator device comprising:
a rotor;
a stator furnished with multiple polarizing sections for driving the rotor; and
the piezo-electric actuator drive circuit of claim 1 for applying drive voltages to the multiple polarizing sections.

5. The piezo-electric actuator drive circuit of claim 1, wherein the piezo-electric actuator is an ultrasonic motor, and the multiple phase voltage pulse generating circuits also execute a second control mode in which voltage pulse waveforms including the same floating period are applied to each of the polarizing sections, and wherein the multiple phase voltage pulse generating circuits start to execute the second control mode when the ultrasonic motor reaches a predetermined rpm, subsequent to the startup of the ultrasonic motor.

* * * * *